United States Patent [19]

Goerenz et al.

[11] Patent Number: 5,407,873

[45] Date of Patent: Apr. 18, 1995

[54] ZIRCONIUM SILICATE BRICK AND METHOD FOR ITS PRODUCTION

[75] Inventors: Edmund Goerenz, Alsdorf-Hoengen; Reinhold Janssen, Tönisforst; Klaus Wächter, Kaarst, all of Germany

[73] Assignee: Dyko Industriekeramik GmbH, Dusseldorf-heerdt, Germany

[21] Appl. No.: 166,646

[22] Filed: Dec. 10, 1993

[30] Foreign Application Priority Data

Dec. 22, 1992 [DE] Germany .................. 42 43 538.2

[51] Int. Cl.$^6$ ........................................... C04B 35/106
[52] U.S. Cl. ..................................................... 501/106
[58] Field of Search ......................................... 501/106

[56] References Cited

U.S. PATENT DOCUMENTS

| | | | |
|---|---|---|---|
| 1,872,876 | 8/1932 | Bjorkstedt. | |
| 2,323,951 | 7/1943 | Wainer | 106/57 |
| 2,352,530 | 6/1944 | Fulcher | 106/57 |
| 2,752,259 | 6/1956 | Cook | 106/57 |
| 3,347,687 | 10/1967 | Henry | 106/57 |
| 4,508,835 | 4/1985 | Kaniuk et al. | 501/106 X |
| 5,104,833 | 4/1992 | Matsumoto et al. | 501/106 X |
| 5,124,287 | 6/1992 | Wehrenberg et al. | 501/106 |

FOREIGN PATENT DOCUMENTS 0438300 1/1990 European Pat. Off. .

OTHER PUBLICATIONS

Patent Abstracts of Japan, C-850, Jul. 17, 1991, vol. 15/No. 282, "Heat Resistant Phosphate-Zircon Combined Body and Production Thereof".

Patent Abstracts of Japan, C-850, Jul. 17, 1991, vol. 15/No. 282. "Heat Resistant Phosphate Sintered Body and Production Thereof".

*Primary Examiner*—Karl Group
*Attorney, Agent, or Firm*—Hopkins & Thomas

[57] ABSTRACT

A zirconium silicate brick and a method for producing same, the brick having a starting powder used to form the brick, the starting powder having minimal amounts of contaminants in the amount of not more than about 0.3 percent $Al_2O_3$, not more than about 0.2 percent $TiO_2$, and not more than about 0.1 percent $Fe_2O_3$, each, based on the weight of the starting powder, to which a phosphorous compound in the amount of about 0.1 percent to about 5 percent based on the weight of the starting powder is added prior to making the brick for producing a brick with improved corrosion resistance for use in glass melting facilities with boron silicate glasses, and having improved decomposition behavior at higher glass melting temperatures.

14 Claims, No Drawings

ZIRCONIUM SILICATE BRICK AND METHOD FOR ITS PRODUCTION

FIELD OF THE INVENTION

The invention relates to a zirconium silicate brick of a fine grained $ZrSiO_4$ starting powder with 62% to 66% $ZrO_2$ and 33% to 34% $SiO_2$ containing minimal contaminations of $Al_2O_3$, $TiO_2$, and $Fe_2O_3$. Such zirconium silicate bricks are preferably isostatically pressed and densely sintered, and used for glass melting facilities, especially for those in which boron containing glasses are molten.

BACKGROUND OF THE INVENTION

A zirconium silicate brick of the type described above is known from Schulle, "Feuerfeste Werkstoffe" ("Refractory Materials"), first edition, 1990, pp 220–224. For the production of sintered zirconium containing products naturally occurring zirconium silicate is used as a starting material. It is in theory chemically composed of two thirds zirconium dioxide and one third silicone dioxide. Under the influence of high temperatures in the order of 1700° C. a decomposition occurs in the brick along with a distinct change of properties. Titanium dioxide furthers this decomposition. With the simultaneous presence of $Al_2O$, the decomposition begins at lower temperatures in the range of 1500° C. Zirconium silicate products are formed by slip casting, stamping, but also by isostatic pressing, for which a fine grained starting powder is used. An additional binding phase usually is not necessary with these products. The contaminants, especially $Al_2O_3$, $TiO_2$, and $Fe_2O_3$, should be kept to as small a fraction as possible, with the $Al_2O_3$ being contained in a percentage of 0 5% to 10% the $TiO_2<0.1\%$ and the $Fe_2O_3<0.5\%$. By this zirconium silicate refractories can be made that have a raw density between 4.2 g/cm³ up to about 4.5 g/cm³. Especially in glass troughs which are lined with such zirconium silicate bricks and which have temperatures of up to 1700° C., do these bricks fulfill their functions due to the occurring decomposition only inadequately. In contact with the liquid glass of the melt corrosion occurs. The silicone dioxide is washed out and taken away, so that an erosion of the bricks results. The infiltration of $Al_2O_3$-constituents of the glass melt into the zirconium silicate brick and brings about a reaction with the $SiO_2$. The result is the formation of mullite, which is connected with a decrease of the density and a volume expasion. This ultimately limits the service life of such zirconium silicate bricks.

From Verworner and Berndt, "Feuerfeste Baustoffe fur Glasschmelzanlagen" ("Refractory Materials for Glass Melting Facilities"), first edition 1977, pp 96–100, zirconium containing products are known and described therein, in which zirconium of high purity is used. The thermal dissociation is also described here, and the use of fine grained components is recommended. The fractions of continents are likewise fixed to a low level.

From the Shinagawa Techn. Report No. 25 (1981), pp 37–44 it is known to allow titanium dioxide not only in the form of natural contaminants of a fine grained starting powder with a fraction <0.1%, but to add $TiO_2$ in a comparably larger amount as a sinter-aiding means to the fine grained starting powder. By this zirconium silicate bricks of a slightly higher density and smaller porosity can be produced, which have a higher resistance against $Al_2O_3$ diffusion from the glass melt. Several model experiments are reported herein, in which a fine grained starting powder is used with different grain sizes in the range of 300 µm to 2 µm or between 10 µm and 2 µm. Concerning the corrosion resistance, grain sizes between 44 µm to 2 µm are preferred.

It is the object of the invention to provide a zirconium silicate brick and a method for its production, which has a high corrosion resistance when used in glass melting facilities for boron silicate glasses and for which the described decomposition behavior at higher temperatures is reduced.

DETAILED DESCRIPTION OF THE INVENTION

According to the invention this is attained for a zirconium silicate brick that contains one or more phosphorus compounds in the range of 0.1% to 5% by weight. For this, phosphorus compounds in such fractions may be added, so that the baked zirconium silicate brick preferably contains not more than 1% $P_2O_5$ by weight.

The addition of reactive phosphorus in the phosphorus compound results in two effects. For one thing the fraction of $Al_2O_3$ that is contained as a contaminant is bound. On the other hand a binding of the in-diffusing $Al_2O_3$ from the glass melt is achieved. In both cases there is a binding to $AlPO_4$, and as a result the dissociation is reduced. Furthermore, $AlPO_4$ is a highly refractory compound, which can withstand temperatures of up to 2000° C. The new zirconium silicate brick has a greatly extended service life. In the usual temperature range it has a comparably small change of volume, so this also counteracts the indiffusion process. Especially surprising properties and results are obtained for such zirconium silicate bricks, when the zirconium silicate used as a starting material has contaminants of not more than 0.3% $Al_2O_3$, 0.2% $TiO_2$, and 0.1% $Fe_2O_3$ by weight.

It is especially advantageous in this connection to use a starting powder with a grain size of not more than 20 µm, better yet not more than 10 µm. By this not only a relatively higher raw density is obtained, but also a finer dispersion of the reactive fraction of the phosphorus in the brick, so that it can better fulfill its function to bind the $Al_2O_3$.

Even though, as is well known, the contaminants in the starting powder should not exceed an upper limit, in the present case it is advatageous that the zirconium silicate brick should contain $TiO_2$ in the range of not more than 5%—preferably 1%—by weight as a sinter-aiding means. Up to contents of not more than 1% by weight the dissociation is not degraded appreciably, instead there is the advantageous possibility to obtain comparably dense bricks.

As a phosphorus compound the brick may contain phosphoric acid, salts and esters of phosphoric acid, phosphonic acid, phosphites, phosphonic acid ester, hydrophosphorous acid, salts and esters of hydrophosphorous acid, diphosphoric acid, diphosphorous acid, salts of the diphosphorous acid, polyphosphoric acids, metaphosphoric acids, and salts of metaphosphoric acid. These phosphorus compounds can be used alone or in combination. Using phosphoric acid alone already leads to acceptable results.

Such a zirconium silicate brick may have a raw density $\geq 4.30$ g/cm³. An open porosity <0.5% is obtainable.

A method for producing such a zirconium silicate brick can provide that the fine grained starting powder is formed and baked, and that a phosphorus compound in the order of 0.1% to 5% by weight is added to the starting powder. It has proven to be suitable to use phosphorus compounds up to 1% $P_2O_5$ by weight in the final product. The starting components are colmated, dried, possibly spray dried in a wet-homogenizing process and pressed isostatically to a brick, preferably under a pressure above 1000 bar. After baking at temperatures in the range of 1500° C. to 1680° C. the desired properties of the zirconium silicate bricks are obtained.

Titanium dioxide preferably in the range of 0.1% to 5% by weight is added as a sinter-aiding means to the fine grained starting powder. By this the sintering process is furthered, and an especially dense microstructure results.

The use of starting powders in a state as fine grained as possible is also important. Generally the starting powder should be ground to a grinding fineness of not more than 20 μm, preferably not more than 10 μm.

The titanium dioxide of technical purity can be used in the form of a rutile- or anatase-pigment. This is done preferably with a grain size of not more than 5 μm, especially not more than 1 μm.

For producing zirconium silicate bricks with an especially long service life the use of a fine grained starting powder consisting of 98% zirconium silicate by weight, 1.5% titanium dioxide by weight, and 0.5% of a phosphorus compound by weight is recommended. These fractions can be slightly varied within certain limits.

The invention is again described with the aid of the following compositional examples:

Example One

When using a starting powder with a grain size below 40 μm and a fraction of 98% $ZrSiO_4$ by weight, as is known from the state of the art, adding 1.5% $TiO_2$ and not using any phosphorus compound results in a raw density of about 4.2 g/cm$^3$ in conjunction with an open porosity of 2.3%. After an employment at 1700° C. for one hour about 15% of the $ZrSiO_4$ has been decomposed.

Example Two

Using as a starting powder $ZrSiO_4$ with a fraction of 98% by weight, but with a grain size <10 μm adding 1.5% $TiO_2$ and also 0.5% phosphorus compounds by weight, the obtainable raw density rises to about 4.35 g/cm$^3$, in conjunction with an appreciable improvement of the open porosity to about 0.5%. The fraction of decomposed $ZrSiO_4$ after one hour at 1700° C. has been notably reduced to about 10%.

Example Three

A further improvement comes from a low titanium dioxide content. If, for example, 98.5% $ZrSiO_4$ by weight with a fineness <10 μm is used with only 1% $TiO_2$ by weight and 0.5% of a phosphorus compound by weight as a starting material, raw densities of up to 4.4 g/cm$^3$ with an open porosity of 0.2% are attainable. The decomposition of $ZrSiO_4$ after one hour at 1700° C. surprisingly is not more than 5%.

Example Four

When the fraction of fine grained $ZrSiO_4$ is further increased and there is no addition of phosphorus compounds, noticably disadvantageous properties result. When using 99% $ZrSiO_4$ weight <10 μm together with 1% $TiO_2$ the result is a zirconium silicate brick with a raw density of 4.35 g/cm$^3$, but with an open porosity grown to 0.7%, and also the fraction of decomposed $ZrSiO_4$ after one hour at 1700° C. has risen to about 10%. This shows the fundamental importance of adding the phosphorus compound.

Example Five

A comparably high fraction of phosphorus compounds does not lead to a comparable improvement of the properties, while the open porosity still lies in a relatively favorable range. For instance $ZrSiO_4$ with a fineness <10 μm with a fraction of 94% with 2% $TiO_2$ and 4% of a phosphorus compound can be used. The result is a raw density of 4.3 g/cm$^3$ and an open porosity of 0.7%. The fraction of decomposed $ZrSiO_4$ after one hour at 1700° C. is about 8%.

Example Six

An especially high fraction of titanium dioxide will lead to an especially dense microstructure, but the dissociation becomes unfavorable. When using $ZrSiO_4$ with a fineness <10 μm and a fraction of 95% in conjunction with 4% $TiO_2$ and 1% of a mixture of phosphorus compounds the result for the finished zirconium silicate brick is a raw density of 4.41 g/cm$^3$ and an open porosity of 0.2%. But the fraction of decomposed $ZrSiO_4$ after one hour at 1700° C. already is about 13%.

The examples are summarized in the following table:

| Beispiel | | 1 | 2 | 3 | 4 | 5 | 6 |
|---|---|---|---|---|---|---|---|
| $ZrSiO_4$ < 40 μm | % | 98.5 | — | — | — | — | — |
| $ZrSiO_4$ < 10 μm | % | — | 98 | 98.5 | 99 | 94 | 95 |
| $TiO_2$ | % | 1.5 | 1.5 | 1 | 1 | 2 | 4 |
| Phosphorus compound | % | — | 0.5 | 0.5 | — | 4 | 1 |
| Raw density | g/cm$^3$ | 4.20 | 4.35 | 4.40 | 4.35 | 4.30 | 4.41 |
| Open Pores | % | 2.3 | 0.5 | 0.2 | 0.7 | 0.7 | 0.2 |
| Fraction of decomposed $ZrSiO_4$ after 1 hour at 1700° C. | % | ca. 15 | ca. 10 | ca. 5 | ca. 10 | 8 | 13 |

While the foregoing specification sets forth preferred embodiments of the invention, it will be understood by those skilled in the art that variations and modifications thereof can be made without departing from the spirit and scope of the invention as set forth in the following claims.

We claim:

1. A zirconium silicate brick, the brick being produced from a fire grained $ZrSiO_4$ starting powder in which $ZrO_2$ is present in the amount of about 62 to about 66 percent, and in which $SiO_2$ is present in the amount of about 33 to about 34 percent, each, based on the weight of the starting powder, comprising:
   at least one phosphorous compound in the amount of about 0.1 to about 5 percent based on the weight of the starting powder;
   wherein the staffing powder also comprises minimal amounts of contaminants in the amount of not more than about 0.3 percent $Al_2O_3$, not more than about 0.2 percent $TiO_2$, and not more than about 0.1 percent $Fe_2O_3$, each, based on the weight of the starting powder.

2. The brick of claim 1, wherein the brick further comprises $TiO_2$ added to the starting powder in an amount not greater than about 5 percent based on the weight of the starting powder to aid in the sintering of the brick.

3. The brick of claim 2, wherein $TiO_2$ does not comprise more than about 1 percent of the weight of the starting powder.

4. The brick of claim 1, wherein said phosphorous compound is selected from at least one member of the group consisting of phosphoric acid, salts and esters of phosphoric acid, phosphonic acid, phosphites, phosphonic acid ester, hydrophosphorous acid, salts and esters of hydrophosphorous acid, diphosphoric acid, diphosphorous acid, salts of diphosphorous acid, polyphosphoric acids, metaphosphoric acids, and salts of metaphosphoric acid.

5. The brick of claim 1, wherein said brick has a raw density of no less than 4.3 grams per cubic centimeter.

6. The brick of claim 1, wherein said brick has an open porosity of less than 0.5 percent.

7. The brick of claim 1, wherein the starting powder of the brick consists of 98 percent zirconium silicate, 1.5 percent titanium dioxide, and 0.5 percent of said phosphorous compound, each, based on the weight of the starting powder.

8. A method of producing a zirconium silicate brick, the brick being produced from a fine grained zirconium silicate starting powder in which $ZrO_2$ is present in the amount of about 62 to about 66 percent, and in which $SiO_2$ is present in the amount of about 33 to about 34 percent, each, based on the weight of the starting powder, comprising the steps of:

limiting the contaminants in the starting powder in the amounts of not more than about 0.3 percent $Al_2O_3$, not more than about 0.2 percent $TiO_2$, and not more than about 0.1 percent $Fe_2O_3$, each, based on the weight of the starting powder, adding a phosphorous compound to the starting powder, forming the starting powder into the brick, and baking the brick.

9. The method of claim 8, further comprising the step of adding titanium dioxide to the starting powder in the amount of about 0.1 to about 5 percent based on the weight of the starting powder for sintering the brick during baking.

10. The method of claim 9, wherein the step of adding titanium dioxide to the starting powder includes the selection of titanium dioxide in the form of a ruffle pigment and an anatase pigment.

11. The method of claim 9, wherein the titanium dioxide added to the starting powder has a grain size not greater than 5 $\mu$m.

12. The method of claim 11, wherein said titanium dioxide has a grain size not greater than 1 $\mu$m.

13. The method of claim 8, further comprising the step of grinding the starting powder to a grinding fineness not greater than 20 $\mu$m.

14. The method of claim 13, wherein the starting powder is ground to a grinding fineness not greater than 10 $\mu$m.

* * * * *